United States Patent Office 3,414,518
Patented Dec. 3, 1968

3,414,518
PREPARATION OF CARBOXYLIC ACID-KETONE
MIXTURE FROM CERTAIN OLEFIN MIXTURES
Michael Dubeck, Birmingham, and Lawrence C. Mitchell, Clawson, Mich., assignors to Ethyl Corporation, New York, N.Y., a corporation of Virginia
No Drawing. Original application Oct. 1, 1964, Ser. No. 400,941. Divided and this application Feb. 8, 1968, Ser. No. 719,283
4 Claims. (Cl. 252—55)

ABSTRACT OF THE DISCLOSURE

A process for preparing carboxylic acid-ketone mixtures by (a) ozonizing non-vinylidene-vinylidene olefin mixtures in a lower alkanol reaction medium (b) then oxidizing the ozonized olefin mixture in the presence of an aqueous mineral acid using an oxygen containing gas. The product is useful as a lubricant.

This is a division of application Ser. No. 400,941, filed Oct. 1, 1964.

This invention relates to a novel process for the preparation of carboxylic acids. More specifically it relates to a preparation of carboxylic acids from olefins using ozone as an oxidant.

An object of this invention is to provide a method for the preparation of carboxylic acids. Another object is to provide a means for oxidizing olefins to carboxylic acids. Additional objects will be apparent from the following detailed description and appended claims.

The objects of this invention are accomplished by providing a process for the preparation of a carboxylic acid, said process comprising:

(1) Reacting an olefin having at least two hydrogen atoms bonded to an ethylene linkage and a non-vinylidene configuration with ozone in the presence of a lower alkanol having one to three carbon atoms and at a temperature within the range of from about −80° to about 35° C., said olefin being free of cycloalkenyl and aromatic radicals and having from 6 to about 30 carbon atoms;

(2) Adding water and a catalytic quantity of a mineral acid to the product thereby produced, and (3) Contacting the resultant mixture with an oxidizing gas containing elemental oxygen at a temperature within the range of from about 50° to about 150° C.

In a highly preferred embodiment the lower alkanol is methanol. In another highly preferred embodiment, a mineral acid added to the ozonization acid mixture is sulfuric acid.

The process of this invention comprises two chemical reactions. First, a reaction of an olefin with ozone, and second, a reaction of the products thereby produced with an oxygen-containing gas. It has been found that the yield of carboxylic acid product is increased if the first reaction is carried out in the presence of a lower alkanol and the second in the presence of a lower alkanol, water, and a catalytic quantity of a mineral acid. Hence, the process of this invention also comprises a solvent-alteration.

Olefins having at least two hydrogens bonded to the ethylenic carbon atoms other than vinylidene olefins yield carboxylic acids when reacted according to this process. Vinylidene olefins have the formula

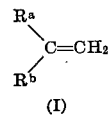

(I)

wherein $R^a$ and $R^b$ are hydrocarbon or substituted hydrocarbon radicals. Vinylidene olefins yield ketones when subjected to the process of this invention. A preferred embodiment of this invention is a process which entails the oxidation of a mixture of olefins comprising one or more vinylidene olefins. The ketone-carboxylic acid mixtures afforded by this preferred embodiment have desirable properties.

Certain types of non-vinylidene olefins are preferred reactants. Preferred olefins are free of aromatic and cycloalkenyl groups. More preferably, the olefins are free of other organic groups which undergo extraneous side reactions. In other words, the preferred olefinic starting materials are free of cyclic structures which contain carbon-carbon unsaturation and more preferably, contain organic radicals (bonded to the ethylenic bond) which are stable under the reaction conditions employed. Thus, the more preferred olefins have at least one free ethylenic linkage and do not contain organic radicals which undergo extraneous side reactions under the reaction conditions employed. A free ethylenic linkage is an ethylenic bond which is not in juxtaposition with substituent groups which prevent the process from being carried out by steric hindrance or by such a gross perturbation of the electronic characteristics of the ethylenic linkage that it is incapable of reacting as an ordinary double bond.

Thus, the more preferred olefinic reactants do not contain an oxygen, nitrogen or sulfur atom bonded to a carbon atom adjacent to the double bond and the olefinic linkage to be reacted is not part of a conjugated diene system. In other words, the more preferred olefinic reactants contain a double bond which is isolated by at least one methylene group (—CH₂—) from any non-hydrocarbon substituent group or other ethylenic linkage.

Highly preferred olefinic reactants are hydrocarbon olefins, that is, olefins which are solely composed of carbon and hydrogen. Most preferably the olefinic reactants have the formula:

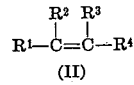

(II)

wherein $R^1$, $R^2$, $R^3$, and $R^4$ are groups selected from the class consisting of hydrogen and alkyl radicals having from one to about 28 carbon atoms, such that at least two of said groups are hydrogen and said olefin has from six to about 30 carbon atoms and a non-vinylidene configuration.

Although olefins having cycloalkyl groups are applicable in this invention, olefins having alkyl radicals bonded to the ethylenic linkage are preferred because they are more readily available. Although the process of this invention can be employed to oxidize small olefinic compound, such as ethylene and propylene, better results are usually obtained when an olefin having from six and preferably eight to about 30 carbon atoms is employed as a reactant. Olefins having from 6 to 20 carbon atoms are more preferred.

Thus, one type of preferred olefin reactant is selected from the terminal olefins having the formula:

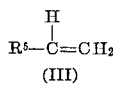
(III)

wherein $R^5$ is an alkyl radical having from 4 to 28 carbon atoms.

Another type of preferred olefin reactant is selected from the internal olefins having the formula:

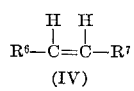
(IV)

wherein $R^6$ and $R^7$ are selected from the alkyl radicals having from 1 to about 27 carbon atoms, such that the total number of carbon atoms in $R^6$ and $R^7$ is at least 4 and not more than about 28. The most preferred internal olefins are β-olefins; that is, the olefinic linkage is one carbon atom removed from the end of the chain.

The alkyl radicals which are bonded to the olefinic linkages and the olefinic reactants employed in this process can be n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and the like, and all positional isomers thereof. The most preferred radicals have from 12 to about 18 carbon atoms and the highly preferred radicals have an even number of carbon atoms. In other words, the highly preferred radicals are the dodecyl, tetradecyl, hexadecyl, and octadecyl radicals. Since they are more readily available, olefins containing straight chain alkyl groups are more preferred than the olefins which contain branched alkyl radicals.

The first step of this process comprises reacting one or more olefins of the type described above with ozone. It is preferred that the ozone be in the gaseous state and more preferably admixed in a minor amount with an inert carrier gas. Carrier gases which may be employed are the inert gases such as argon and neon and the like and most preferably, nitrogen, oxygen, air, carbon dioxide and mixtures thereof. In a preferred embodiment, the carrier gas contains at least 20 percent by weight oxygen and more preferably is substantially pure oxygen. In other words, in this more preferred embodiment the ozone reactant is an ozone-oxygen gaseous stream. The concentration of the ozone in the carrier gas is not critical and may range from about 0.001 to about 30 percent by weight. Most preferably the concentration is within the range of about 0.001 to about 20 percent by weight. In a highly preferred embodiment the ozone concentration is from about 0.01 to about 10 weight percent.

The first step of this process can be carried out by contacting a molar equivalent ratio of olefin and ozone; however, it is not necessary to do so. Thus, good results are obtained if a slight excess of olefin is employed; for example, from about 1.20 moles of olefin per each mole of ozone. However, in many instances, higher yields are obtained when an excess of ozone is used. In general it is preferred that from 1 to about 2 moles of ozone be employed per each mole of olefin. Greater excesses of ozone such as 3 moles per mole of olefin can be employed if desired. However, in many instances, significant advantages are not obtained with these higher mole ratios.

The amount of ozone admitted to the reaction zone can be determined by any method known in the art. For example, when an ozone-oxygen stream is employed, the concentration of the ozone can be determined by the difference in thermal conductivity of the ozone-oxygen mixture as compared with the thermal conductivity of pure oxygen. Multiplication of the concentration of ozone by the total volume of gas admitted yields the amount of ozone admitted to the reaction zone.

In order to insure a complete utilization of the ozone and thereby keep the cost at a minimum, it is frequently desirable to regulate the flow of ozone through the liquid reaction mass so that the ozone added is completely reacted with the olefin. In some instances, higher yields of product are obtained if the ozone-containing stream is pushed through the reaction mixture at a rate which affords the presence of ozone in the effluent gaseous stream. A convenient method for determining if the ozone is completely utilized in the reaction zone is the passage of the effluent gas through an aqueous potassium iodide tower. Any ozone which is not utilized by the reaction mixture oxidizes the iodide to free iodine. The presence of free iodine can be quantitatively determined by titration with sodium thiosulfate according to the method in Scott's Standard Methods of Chemical Analysis, volume 1, p. 279.

The first step of this process can be conducted at atmospheric, superatmospheric, or subatmospheric pressures. The exact atmosphere employed is not critical, and in most cases the reaction is effectively carried out at substantially atmospheric pressure.

The reaction of ozone with an olefin in this process is carried out at a temperature within the range of from about $-100°$ C. to about $50°$ C. More preferably, the reaction temperature is within the range of from about $-70°$ to about $35°$ C. The most preferred reaction temperatures are within the range of from about $-10°$ to about $35°$ C. In most instances, heat is evolved during the reaction of ozone with the olefin; hence, efficient cooling means are usually desired.

In tihs process, the reaction of ozone with an olefin is conducted in the presence of a lower alkanol as a reaction medium. Preferred alkanols have from 1 to 3 carbon atoms and no olefinic unsaturation. These preferred lower alkanols are methanol, ethanol, n-propanol, and iso-propanol. Methanol and ethanol are preferred and methanol highly preferred. A small amount of water in the lower alkanol can be tolerated. In general, the amount of water should be less than about 5 percent, most preferably less than 3 percent by weight. Sufficient lower alkanol should be employed to produce a readily fluid reaction mixture. Generally, a weight of alkanol amounting to at least the weight of olefin reactant is required, and in most cases, at least twice this amount is desirable. Up to 20 or more times the weight of the olefin reactant can be employed if desired.

This process is carried out by contacting the olefin and ozone in the reaction medium of the type specified above at the desired temperature and pressure. The method of contacting the reactants is not critical and any method known in the art can be employed. Frequently, it is desirable to admix the olefin and the lower alkanol in a reaction vessel and subsequently pass ozone or an ozone-containing gas through the resultant liquid. Agitation of the liquid medium containing the olefinic reactant is not critical. However, in many instances agitation by either stirring or rocking enhances the rate of reaction and provides a more even reaction rate. In many instances the agitation caused by the bubbling of the ozone-containing gas through the liquid reaction mixture is sufficient.

The time of reaction between ozone and an olefin is not a truly independent variable but depends at least to some extent on the other reaction conditions employed such as the concentration of ozone. For example, efficient agitation of the reaction mixture usually results in a lessening of reaction time. On the other hand, inefficient contacting of the reactants usually lengthens the reaction time. In most instances, the reaction is complete after a reaction time within the range of from about 15 minutes to 35 hours.

After the ozonization of the olefin is completed, a catalytic quantity of a mineral acid is added to the resultant reaction mixture. Typical mineral acid catalysts which can be employed includes hydrochloric acid, sulfuric acid, metaphosphoric acid, triphosphoric acid, orthophosphoric acid, pyrophosphoric acid, and the like.

In general, an amount of mineral acid between about 0.0001 and 15 moles per each mole of starting olefin is employed. A preferred acid concentration is from 0.001 to 1.0 mole and a most preferred range from 0.001 to 0.3 mole per mole of olefin.

If desired, the second reaction mixture can contain minor amounts of other materials. Adjuvants which may be added to the mixture include metal salts; most preferably, the salts of the metals within Group VIII of the Periodic Table. Of these salts, those of iron, cobalt, nickel, palladium, and platinum are preferred. Most preferably, cobalt, palladium and platinum salts are employed. Typical metal salts are iron chloride, cobaltous acetate, and the like. Metal oxides are also suitable adjuvants. Typical metal oxides which may be employed are silver oxide, cupric oxide, ferric oxide, and the like. Usually the above adjuvants are employed in minor amounts. Thus, their concentration within the second reaction medium is usually within the range of from about 0.0001 to about 1.0 weight percent.

Water can be added with the mineral acid. In general, from 0.01 to about 10 moles of water per mole of starting olefin is added, most preferably from 0.1 to about 5.0 moles.

The second chemical reaction in this process comprises the oxidation of the products of the ozonization reaction (admixed with the mineral acid, and optionally, water as described above) with an oxygen-containing gas. The oxygen-containing gas may be pure oxygen or air or oxygen admixed with an inert carrier gas. Carrier gases which may be employed are the inert gases such as argon, neon, and the like; nitrogen, carbon dioxide, steam, and mixtures thereof. In a preferred embodiment, the carrier gas contains at least 20 percent by weight oxygen. Highly preferred oxygen-containing gases are pure oxygen and air.

It is preferred that the amount of oxygen employed be sufficient to oxidize all of the ozonization residue to the corresponding carboxylic acid(s). In general, at least a stoichiometric equivalent of oxygen is employed. A slight excess of oxygen frequently increases the yield. Thus, in many instances it is desirable to employ from about 1.0 to about 4 moles of oxygen per each mole of starting olefin. Most preferably, the amount of oxygen employed is within the range of from about 1.0 to about 2.5 moles. In general, it is desired that a much larger excess of oxygen be bubbled through the reaction mixture, say 50 to 100 or more moles of oxygen per mole of starting olefin to insure the completeness of the oxidation. The oxidation step can be carried out in the presence of the metal salts in the concentration above described, if desired.

The oxidation of the ozonization residues is carried out at a temperature which affords a reasonable rate of reaction and a minimum of by-product formation. In general, suitable reaction temperatures are within the range of from about 30 to about 180° C. More preferably, the reaction temperature is within the range of from about 40 to about 175° C., and most preferably between about 50 to about 150° C.

The oxidation step is conveniently carried out by bubbling oxygen through the liquid reaction mixture. In many instances, the bubbling action causes sufficient agitation to insure sufficient contact of the reactants. If desired, other agitation means such as stirring and rocking can be employed. The time of reaction is not a truly independent variable but is dependent at least in part on the other reaction conditions employed. In most instances the reaction is substantially complete in from about one-half to about 60 hours.

The process of this invention can be carried out as a batch process or as a continuous operation. In many instances, higher yields of product are obtained when the ozonization step is carried out in an apparatus similar to an Oldershaw distilling column. In other words, it is preferred that the reaction be carried out in an apparatus having a multiplicity of reaction zones. Such an apparatus provides a continuous process, a minimum residence time and thereby obviates to a great extent any possible side reactions. A typical internally fed counter-current apparatus for laboratory-scale operations is illustrated in FIGURE 5 on page 7 of Basic Manual of Applications and Laboratory Ozonization Techniques; the Welsbach Corporation, Ozone Processes Division, Westmoreland and Stokley Streets, Philadelphia, Pennsylvania. Similarly, the second reaction step is conveniently carried out in a multistage reactor having a contact time of about one hour at each stage. In a highly preferred embodiment, the ozonization product admixed with the second reaction medium is fed continuously into one stage of a multistage reactor provided with means for bubbling an oxygen-containing gas through a portion of the fed reaction mixture and overflow means which, by siphoning action, carries the oxygen-treated reaction mixture from one stage to another. The second stage is also provided with means for bubbling oxygen through the fed reaction mixture and siphoning means to carry the treated mixture to another stage. The number of stages which are employed is not critical; however, from 4 to about 12 are preferred. Each stage except the last one also has means for bubbling oxygen through the mixture to be treated and overflow means to convey the treated mixture to the next stage. The last stage has means for bubbling oxygen through the reaction mixture and means to forward the treated material to a product collection device. The latter means may, as above, be a siphoning apparatus. In a highly preferred embodiment, the reaction mixture at each successive stage is heated to a higher temperature. Thus, for example, the temperature of the fed reaction mixture at the first stage can be about 50° C., the second 60° C., the third 70° C., and so on.

In a very highly preferred embodiment, the process of this invention is carried out on a mixture of olefins having from 12 to about 26 carbon atoms. Preferably the mixture contains at least about 60 percent of $C_{12}$–$C_{16}$ olfins which do not have a vinylidene structure. Preferably the olefin, when reacted according to the process of this invention, will yield a mixture of fatty acids which is predominately composed of $C_{11}$–$C_{15}$ acids. Thus, for example, the process is most preferably carried out on olefinic mixtures which contain a high percentage of terminal olefins within the $C_{12}$–$C_{16}$ range and high percentages of β-olefins within the $C_{13}$–$C_{17}$ range. Preferably the olefin mixture should yield a fatty acid mixture which is predominantly $C_{11}$ or $C_{12}$ acid or mixtures thereof. Thus, the preferred olefin feeds yield a a product of the following description.

| Acid | Percent by weight |
|---|---|
| $C_9$–$C_{10}$ | 1–3 |
| $C_{11}$–$C_{12}$ | 60–70 |
| $C_{13}$–$C_{14}$ | 20–30 |
| $C_{15}$–$C_{16}$ | 7–10 |

The following examples serve to illustrate the process of this invention but do not limit it. All parts are parts by weight unless otherwise noted.

Example 1

Into a reaction vessel equipped with efficient cooling means, gas inlet means, and a reflux condenser was charged 3.36 parts of 1-dodecene and 126 parts of methanol. Thereafter, an ozone-oxygen stream, 1.07 millimoles per liter, was bubbled into the resultant mixture until a slight excess of ozone had been admitted. During the bubbling the reaction temperature was maintained between —20° and —30° C. After the ozone-contacting had been completed the resultant reaction mixture was warmed to room temperature and divided into two equal portions.

One portion was added to a reaction vessel equipped with gas inlet means, cooling means, and a refluxing condenser. The mixture was refluxed and stirred and oxygen bubbled in at the rate of 80 ccs. per minute. The oxygen-addition, at reflux, was allowed to continue overnight. A sample of the resultant reaction mixture was taken and analyzed for active oxygen. The analysis indicated that no substantial reduction in active oxygen had taken place and an appreciable amount of undecanoic acid had not been fomed.

When the reaction is repeated except that 100 parts of water and between 0.0001 and 15 moles per each mole of starting olefin of sulfuric acid is added to the ozonization product, an appreciable yield of undecanoic acid is produced demonstrating the catalytic action of sulfuric acid in the second oxidation step.

Example 2

Into a reaction vessel equipped as in Example 1 was charged 13.46 grams of dodecene-1 and 64 parts of methanol. Thereafter, ozone was reacted with the resultant mixture as in Example 1. After the ozonization had been completed, 10 parts of water and 1.86 parts of sulfuric acid was added to the reaction mixture. The acidified mixture was then contacted with oxygen while maintaining the mixture at reflux. The reaction with ozone was carried out by bubbling in oxygen at the rate of 80 ccs. per minute for a period of 18 hours.

After the reaction with oxygen, 200 parts of water was added and the resultant reaction mixture was extracted three times with petroleum ether. The petroleum ether portions used were successively 70 parts, 52.5 parts, and 35 parts. After extraction, the combined organic layers were dried over anhydhous sodium sulfate. After drying, the organic material was separated by filtration. The filtrate was distilled at room temperature and 20 mm. pressure to yield a residue of crude undecanoic acid. Vapor phase chromatographic analysis of the crude product indicated that it contained 79 percent undecanoic acid and the yield was 67 percent.

When the reaction is repeated except that no sulfuric acid is added to the reaction mixture, the yield of product is substantially reduced.

Example 3

The process of Example 1 is repeated except that ethanol is employed instead of methanol. Similar results are obtained. Similar results are also obtained when n-propanol and iso-propanol are employed.

Example 4

The procedure of Example 1 is followed except that 3.72 parts of sulfuric acid is added prior to the oxidation with gaseous oxygen. Similar results are obtained. Similarly, high yields of undecanoic acid are obtained when 0.5 and 5.0 parts of sulfuric acid are employed in the procedure of Example 1.

Example 5

The process of Example 1 is repeated except that the ozonization reaction is carried out at a temperature of −80° C. and 5.0 parts of orthophosphoric acid is employed in place of the sulfuric acid in the second oxidation step. Similar results are obtained when hydrochloric acid, metaphosphoric acid, pyrophosphoric acid, and triphosphoric acid are employed.

Similar results are obtained when the above acids are employed in a concentration range of from 0.001 to 5.0 moles per mole of starting olefin.

Example 6

The procedure of Example 5 is followed except that the ozonization step is carried out at a temperature of 10° C. Similar results are obtained if a stoichiometric amount of ozone is employed in the reaction.

Example 7

The procedure of Example 4 is followed except that the second step, the reaction of the ozonization product with oxygen, is carried out at a temperature of 50° C. Similar results are obtained when the reaction is carried out at a temperature of 150° C.

Example 8

A 26.92 part portion of an olefinic mixture having the following composition:

|  | Mole precent |
|---|---|
| Dodecene-2 | 73.4 |
| Dodecene-3 | 9.9 |
| Dodecene-4 | 5.4 |
| Dodecene-1 | 5.6 |
| Dodecane | 5.7 | is oxidized according to the procedure of Example 5. The product consists of a mixture of the corresponding carboxylic acids derived by a cleavage of the double bond within the olefinic starting materials. A similar product is obtained when the procedure is carried out using an olefinic mixture having the following composition:

|  | Mole percent |
|---|---|
| Dodecene-1 | 6.9 |
| Dodecene-2 | 75.2 |
| Dodecene-3 | 4.8 |
| Mixture of dodecene-4 and dodecene-5 | 6.0 |
| Dodecane | 7.1 |

Example 9

A feed stock is prepared containing equal parts by weight of dodecene-1 and methanol. This stock is charged to a 17-plate Oldershaw column at a point ⅔ of the way down the column. Methanol containing 4.8 weight percent water is charged to the Oldershaw column at the top. The rate of addition of the decene-1 to the column is 45 parts per hour and the rate of addition of the methanol-water mixture is 159 parts per hour. The temperature of the column is maintained at 30–35° C. An ozone-oxygen stream is charged to the column at the bottom. The rate of addition of ozone is 11.4–12.2 parts per hour.

The reacted mixture is collected and the mixture is admixed with 10 parts of sulfuric acid.

The resultant fluid reaction mixture is fed continuously into a reaction column having six stages. Each stage has means for bubbling oxygen through the portion of the fed reaction mixture at each stage and an overflow siphoning means which carries the oxygen-treated reaction mixture from one stage to the succeeding stage. The temperature of the stages are 50°, 60°, 70°, 80°, 90°, and 100° C., respectively. Oxygen is bubbled through the column from the bottom at a rate of 4 cubic feet per minute. The residence time at each stage is one hour.

The product obtained from the overflow means at the last stage (temperature 100° C.) contains undecanoic acid. The acid is isolated from the other components by a continuous distillation.

The above procedure is followed except that an olefinic mixture similar to the mixtures employed in Example 8 is used in place of Example 1. The product is a mixture of the corresponding carboxylic acids obtained by cleavage of the double bond within the olefinic feed components. The detergent range acids are separated from the other products by distillation.

Example 10

An olefinic mixture having the following composition:

|  | Mole percent |
|---|---|
| Dodecene-2 | 60 |
| Dodecene-3 | 9.9 |
| Dodecene-4 | 5.4 |
| Dodecene-1 | 5.6 |
| Dodecane | 5.7 |
| 2-pentyl heptene-1 | 13.4 | is oxidized according to the procedure of Example 6. The product is a mixture comprising the corresponding carboxylic acids derived from the dodecenes and the ketone obtained by the oxidation cleavage of the double bond in the 2-pentyl heptene-1. This product is a superior lubricant. An oil and water emulsion is prepared by adding water to the resultant product mixture. The emulsion has superior lubricant properties.

The long chain carboxylic acids prepared according to the process of this invention are efficaciously employed in the production of soaps. They can be used for the production of potassium or sodium soaps as well as for the production of heavy metal soaps. For this utility a composition of matter comprising $C_{11}$–$C_{15}$ acids in which each component is present in a range of 0–100 percent is preferred. Highly preferred mixtures contain the odd carbon numbered acids resulting from direct ozonolysis of even carbon alpha-olefin feed mixtures. Another highly preferred composition is a mixture of the even carbon numbered acids within the above range derived from the oxidation of an even numbered beta-olefin stream.

Many of the acids prepared by the process of this invention are known in the art and they have the many utilities known for these compounds. For example, the soaps prepared therefrom can be used as driers. The acids can be employed as chemical intermediates. For example, they may be esterified or reacted with an active halogen source to prepare the corresponding acyl halide.

Having fully described the novel process of this invention and the utility of the products produced thereby, it is desired that this invention be limited only within the lawful scope of the appended claims.

What is claimed is:

1. A process for the preparation of a mixture of carboxylic acids, said process comprising:
   (1) reacting ozone with an olefin hydrocarbon mixture consisting of at least one olefin having the formula:

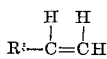

and at least one olefin having the formula:

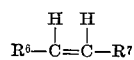

in the presence of a vinylidene olefin having the formula:

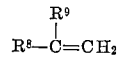

wherein $R^5$ is an alkyl radical having from 4 to about 28 carbon atoms and $R^6$, $R^7$, $R^8$, and $R^9$ are alkyl radicals having from one to about 27 carbon atoms, such that the total number of carbon atoms in $R^6$ and $R^7$ and in $R^8$ and $R^9$ is at least four in the presence of an alkanol having 1 to 3 carbon atoms and at a temperature within the range of from about 80° to about 35° C.;

(2) adding water and a catalytic quantity of a mineral acid to the product thereby produced and, (3) contacting the resultant mixture with an oxidizing gas selected from pure oxygen, air and oxygen mixed with an inert carrier gas at a temperature within the range of 50 to about 150° C.

2. The process of claim 1 wherein said mineral acid is sulfuric acid.

3. The process of claim 2 wherein said lower alkanol is methanol.

4. The process of claim 3 wherein the amount of sulfuric acid added is from 0.001 to about 10 moles per mole of starting olefin.

References Cited
UNITED STATES PATENTS

| | | | |
|---|---|---|---|
| 1,863,004 | 6/1932 | Burwell | 252—52 |
| 2,727,005 | 12/1955 | McKinley et al. | 252—49.5 X |
| 2,808,422 | 10/1957 | Ritter et al. | 260—451 X |
| 3,238,250 | 3/1966 | Bailey | 260—533 X |

DANIEL E. WYMAN, *Primary Examiner.*

W. H. CANNON, *Assistant Examiner.*